(12) United States Patent
Tuken

(10) Patent No.: US 7,930,147 B2
(45) Date of Patent: Apr. 19, 2011

(54) SENSOR RESPONSE TIME ACCELERATOR

(75) Inventor: Taner Tuken, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 94 days.

(21) Appl. No.: 12/364,712

(22) Filed: Feb. 3, 2009

(65) Prior Publication Data

US 2010/0198544 A1    Aug. 5, 2010

(51) Int. Cl.
*H03F 1/26*    (2006.01)
*G06F 19/00*    (2011.01)

(52) U.S. Cl. ........... 702/189; 702/96; 702/104; 123/679

(58) Field of Classification Search .............. 702/45, 702/50, 100, 189; 701/102, 103, 104; 73/23.32; 60/274, 276; 123/673, 679
See application file for complete search history.

(56) References Cited

U.S. PATENT DOCUMENTS

| | | | |
|---|---|---|---|
| 5,540,209 A * | 7/1996 | Hasegawa et al. | ............ 123/679 |
| 5,894,727 A | 4/1999 | Zimlich | |
| 6,282,888 B1 | 9/2001 | Sealy et al. | |
| 6,425,242 B2 | 7/2002 | Booth et al. | |
| 6,467,254 B1 | 10/2002 | Cullen et al. | |
| 6,701,706 B2 | 3/2004 | Bruck et al. | |
| 6,796,129 B2 | 9/2004 | Yee et al. | |
| 6,925,372 B2 | 8/2005 | Yasui | |
| 7,124,013 B2 | 10/2006 | Yasui | |
| 7,310,575 B2 | 12/2007 | Honda | |

* cited by examiner

*Primary Examiner* — John H Le
(74) *Attorney, Agent, or Firm* — Taylor IP, PC

(57) ABSTRACT

A sensor response time acceleration method including the steps of reading a signal step and an operating on the signal step. The reading a signal step includes reading a signal from a sensor, the signal representative of an environmental attribute as detected by the sensor. The operation on the signal step includes operating on the signal with a function of an inverse model of the sensor and a function representative of a desired sensor model to yield an accelerated output representative of the environmental attribute.

20 Claims, 5 Drawing Sheets

SENSOR RESPONSE TIME ACCELERATOR

BACKGROUND OF THE INVENTION

1. Field of the Invention

The present invention relates to a sensor response time acceleration method and apparatus, and more particularly to a sensor response time acceleration method and apparatus applied to a work machine.

2. Description of the Related Art

Work machines, such as agricultural and construction equipment utilize internal combustion engines. The internal combustion engine utilizes a variety of sensors that provide information to a controller that is used to control the operating attributes of the engine. Information from the sensors should ideally reflect the condition that the sensor is measuring. In order for this to be the case the sensor needs to respond immediately to the changes so that the environmental attribute being sensed by the sensor is reported to the controller immediately. However, in reality sensors do take a period of time to adapt to the environmental change so there is an inherent slow response in the information being supplied to controller when operating conditions of the internal combustion engine change.

Sensors, such as temperature sensors, oxygen ($O_2$) sensors and nitrous oxide ($NO_X$) sensors and the like have a notable slow response as compared to the response of a control system that changes the engine's operating parameters. The slow response is an inherent trait in these sensors, for example, if a temperature sensor is moved from ice water to boiling water the sensor output will not immediately change to reflect the current environment but will change over time. The change in the output can be expressed as a function of a differential equation that describes the heat transfer process of conduction of heat to or from the temperature sensor.

A problem with the slow response time of sensors is that control algorithms function based upon the reading of the sensor, which may be a reading of a historical attribute, and not the current attribute being encountered by the sensor. It is desirable to improve the speed at which information from sensors is available so that the changes in the conditions to which they are exposed can be responded to in a timelier manner and to provide a more accurate picture of the measured attribute to the controller. Such a device would provide a greater ability to control the functions of the internal combustion engine, particularly those that need fast responses.

Some techniques that attempt to improve the response time of sensors use a system looking at the change of temperature over a unit of time to predict the temperature. The disadvantage of these prior art methods is that they amplify the noise of the temperature sensor signal resulting in inaccurate assumptions about the environmental attribute.

What is needed in the art is a way to accelerate the response of sensors without introducing unwanted noise so that the environment in which the sensor is operating can rapidly be assessed so that an engine control can quickly respond to the changes to the environmental attribute.

SUMMARY OF THE INVENTION

The present invention provides a sensor response time acceleration method including the steps of reading a signal step and an operating on the signal step. The reading a signal step includes reading a signal from a sensor, the signal representative of an environmental attribute as detected by the sensor. The operation on the signal step includes operating on the signal with a function of an inverse model of the sensor and a function representative of a desired sensor model to yield an accelerated output representative of the environmental attribute.

In another embodiment the present invention consists of a work machine including a structural component, at least one sensor and a controller. The sensor outputs a signal representative of an environmental attribute sensed by the at least one sensor. The at least one sensor is coupled to the structural component. The controller is configured to receive the signal and arrive at a value for the environmental attribute by executing the steps of a method. The method includes the step of operating on the signal with a function of an inverse model of the sensor and a function representative of a desired sensor model to yield an accelerated output representative of the environmental attribute.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
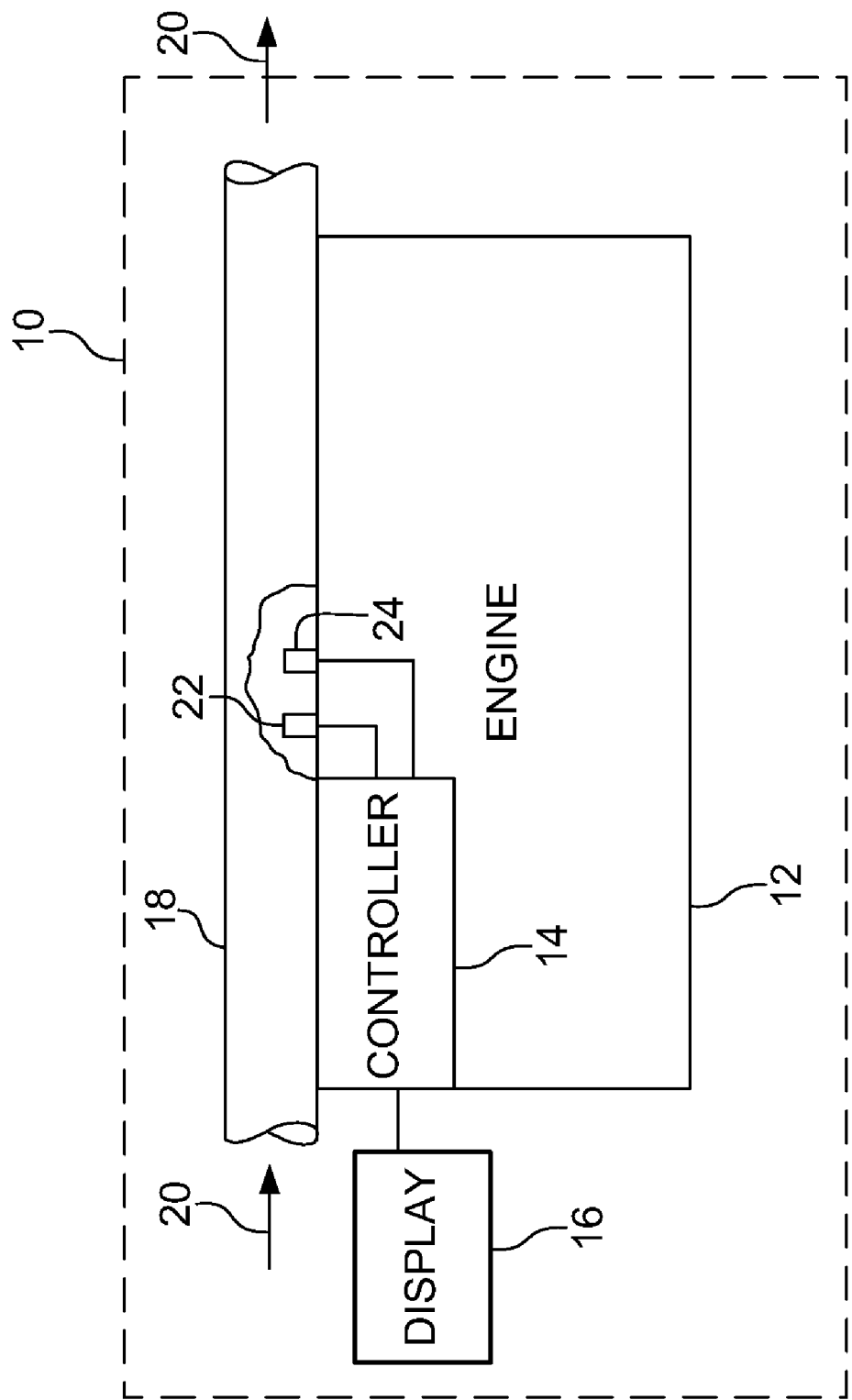
FIG. 1 is schematic illustration of a work machine using an embodiment of an apparatus and method of the present invention.

Referring now to the drawings, and more particularly to FIG. 1, there is illustrated a work machine 10, which may be an agricultural machine, a construction machine, a forester machine or a vehicle. Machine 10 includes an engine 12, a controller 14 and a display 16. Controller 14 is a communication with display 16 as well as with control actuators associated with engine 12. Engine 12 also includes a flow path structural component 18 through which a mass flow 20 traverses. Sensors 22 and 24 are mounted to structural component 18 and are situated to measure environmental attributes of mass flow 20 passing thereby. For ease of discussion sensor 22 will be referred to as a flow sensor 22 and sensor 24 will be referred to as a temperature sensor 24. Flow sensor 22 and temperature sensor 24 are as their name infers testing specific environmental attributes of mass flow 20. Mass flow 20 may be an airflow that can represent combusted gas flowing through flow path structural component 18 or some other mass flow such as coolant within engine 12.

Controller 14 is in communication with sensors 22 and 24 and receives signals therefrom. For purposes of description of the present invention it will be illustrated as controller 14 carrying out elements of the present invention, although it is understood that an apparatus separate for controller 14 can perform this function and feed a signal to controller 14 the functions of the present invention can even be imbedded into sensor 22 and/or 24 as yet another alternative. It is also understood that temperature sensor 24 could have been some other sensor such as an oxygen sensor or a nitrous oxide sensor. As mass flow 20 flows past sensors 22 and 24 changes in environmental attributes of mass flow 20 are detected by sensors 22 and 24, such as the velocity of mass flow 20 is detected by sensor 22 and the temperature of mass flow 20 is detected by sensor 24.

Figure 2:
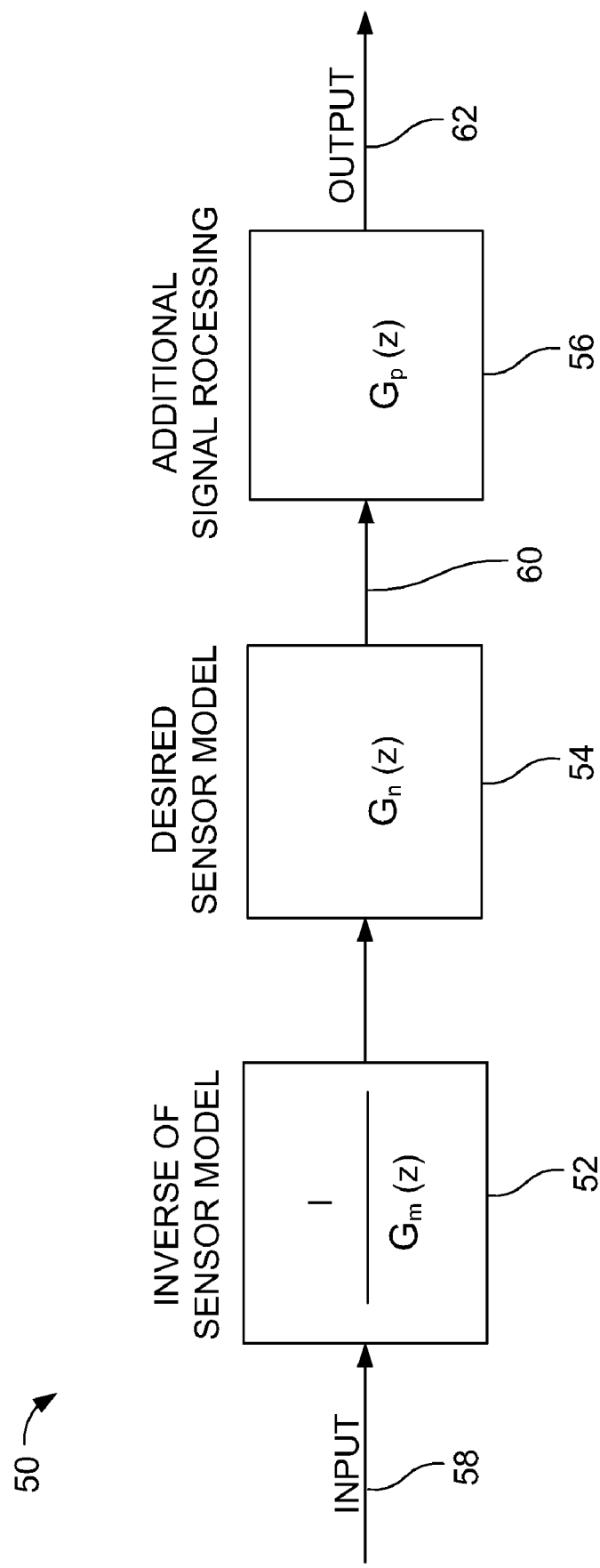
FIG. 2 is a schematic block diagram illustrating an embodiment of a method of the present invention utilized in the work machine of FIG. 1.
Figure 3:
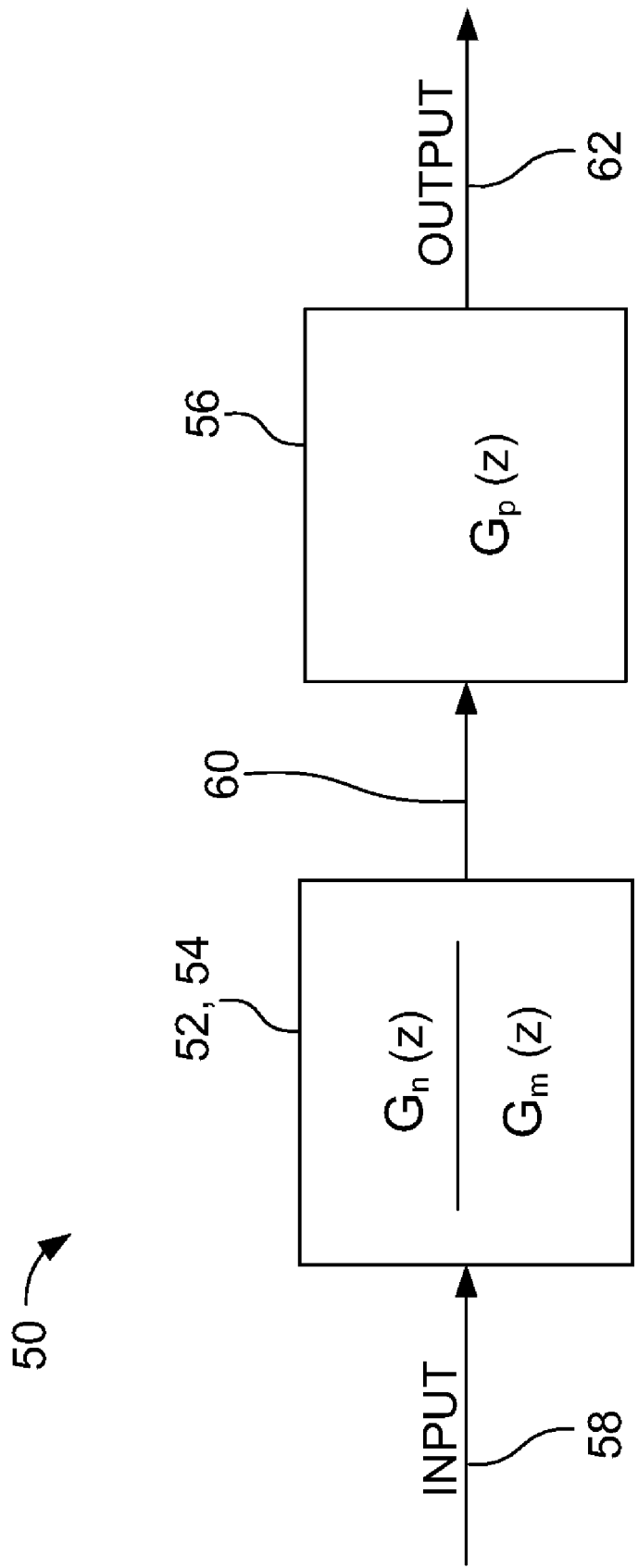
FIG. 3 is a schematic block diagram further illustrating the method of FIG. 2.

Now, additionally referring to FIGS. 2 and 3 there is illustrated a method 50 including an inverse model 52 of sensor 24, a desired model 54 of sensor 24 and additional signal processing 56. This example of the inventive method is one implementation using first order equations and it is also contemplated to carry out the invention with transfer functions of a higher order. FIGS. 2 and 3 illustrate one example of the inventive method, Where:

$G_m(\ )$=Model of the actual sensor response. This can be provided by the sensor manufacturer, or derived from the information specified by the sensor manufacture, such as the time constant of the sensor.

$G_n(\ )$=Desired behavior of the sensor. This is the desired sensor response model, which can represent faster dynamic characteristics as compared to $G_m(\ )$.

$G_p(s)$=Additional signal processing. Such as Low pass filtering for noise attenuation, notch filtering, band-pass filtering. This is optional and is determined by the needs of the system.

In the s (continuous time) domain:

$G_m(s)=a/(s+a)$ $G_n(s)=b/(s+b)$ $G_p(s)=c/(s+c)$ (optional signal processing)

where
b>a and c>>a for a response time acceleration.
In the z (discrete time) domain:

$G_m(z)=z(1-m)/(z-m)$ $G_n(z)=z(1-n)/(z-n)$ $G_p(z)=z(1-p)/(z-p)$ (optional signal processing)

where
n<m and p<<m for a response time acceleration.

The implementation of the elements of method 50 may be carried out by hardware, software or a combination thereof. A function of the present invention is to accelerate the response time of the sensors being utilized. The "m" represents the measurement dynamics of the assumed first order system. The "n" represents the desired or accelerated response dynamic in the discrete or "z" domain representation. The 'p' represents first order additional signal processing 56 that may be used to attenuate noise. An input signal 58 from sensor 24 is operated upon by the function of inverse model 52, the output of which is operated on by desired model 54 resulting in an output 60, which is the accelerated output signal 60. Signal 60 can be further operated on by additional signal processing 56 to provide a filtered output value 62. Additional signal processing 56 is an optional signal processing step, with there not being a requirement to further operate on accelerated output 60. FIG. 2 is provided to provide clarity in the explanation of the present invention, while a preferred implementation is presented in FIG. 3.

The signal resulting from the operation of models 52 and 54 on input 58 is output 60, also known as an Accelerated Output, and is found from the following equation:

$$\text{Accelerated Output} = f \times \text{previous Accelerated Output} + g \times \text{Input} + h \times \text{previous Input}$$

where $f = n$ $g = (1-n)/(1-m)$ $h = -m \times g$

The 'm' can be thought of as representing the discrete time representation of the time constant of the first order filter representation of the measurement systems dynamic. The 'n' represents the discrete time representation of the time constant of the first order filter representation of the desired (accelerated) system dynamic, and the 'p' represents the discrete time representation of the time constant of the first order filter representation of the noise filter. The present invention is intended to be used to accelerate the response of slow measurement sensors; however, it can also be used to slow down the response of a fast measurement system. The values 'm', 'n' or 'p' might be functions of the system operating conditions, such as the velocity of mass flow 20, and can be incorporated in controller 14 in the form of look-up tables or equations.

Figure 4:
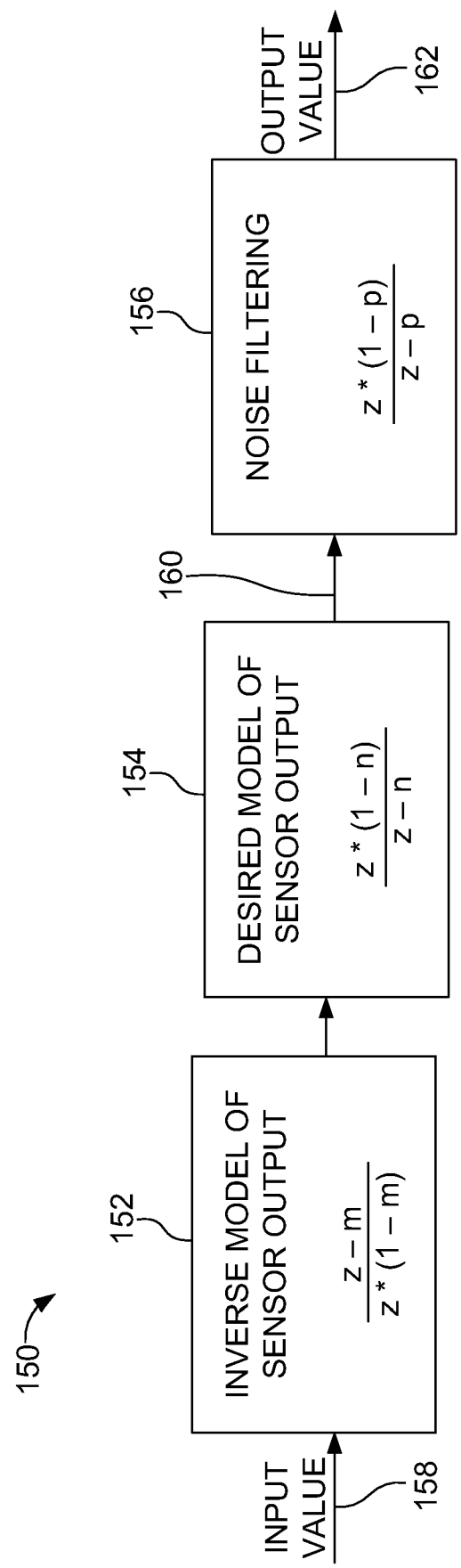
FIG. 4 is a schematic block diagram illustrating a specific implementation of the method of FIG. 2 or 3.

Referring now additionally to FIG. 4 there is illustrated a specific implementation of method 50, with the reference designations being incremented by 100 from those shown in FIGS. 2 and 3. Method 150, which can be thought of as an algorithm 150 includes an inverse model 152 of sensor 24, a desired model 154 of sensor 24 and a noise filter 156. The implementation of the elements of method 150 may be carried out by hardware, software or a combination thereof. An input signal 158 from sensor 24 is operated upon by the function of inverse model 152, and is also operated on by desired model 154 resulting in an output 160, which is the accelerated output signal 160. Signal 160 can be further operated on by noise filter 156 to provide a filtered accelerated output value 162. Noise filter 156 is an optional signal processing step, with there not being a requirement to further operate on accelerated output 160.

Figure 5:
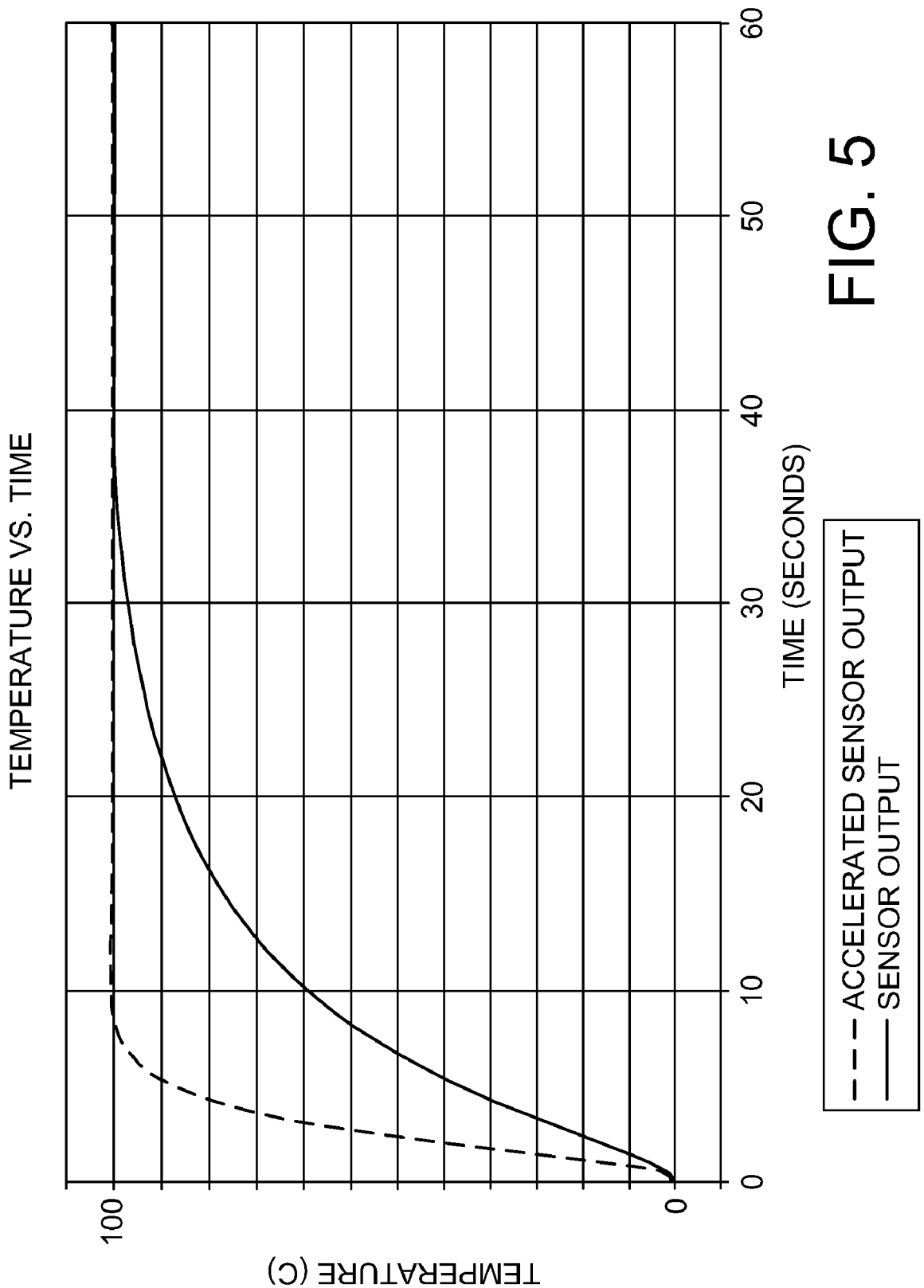
FIG. 5 illustrates the acceleration of the response time of the sensors of FIG. 1 utilizing a method of FIG. 2, 3 or 4.

A temperature sensor is moved from an ice water bath to boiling water and the response of the sensor output is illustrated as the solid line of FIG. 5. The output of the signal processed by the present invention described above is illustrated as the dashed line. As illustrated the sensor output may take approximately 40 seconds to substantially proximate a temperature that has very quickly changed from 0° C. to 100° C. The accelerated sensor output anticipates the temperature and provides an output that it much more responsive since it is accelerated based upon the technique and apparatus of the present invention.

The above descriptions of the present invention was undertaken to illustrate a discrete time domain algorithm. The key concept of the present invention can also be illustrated as a model with three components. Here is a description of the present invention in a continuous time domain using differential equations to describe the sensor's behavior:

1. Read the sensor output, which behaves according to a differential equation $$G_m(s)=a/(s+a)$$

1a. Determine the mass velocity of the sensor and assign values for A, B and C based on tables, empirical data or equations derived therefrom. This is so that the velocity of the gas flow passing a temperature sensor can be factored into the model as well. This is necessitated since the characteristic time constraint of a sensor is also dependent on the velocity and density of the mass that is flowing thereby. The parameters of A, B and C, are 'a', 'b' and 'c' representing the continuous time representation of the time constant. There is a determination of the velocity of the mass passing the sensor that is used in the determination of the selection of the assigned values for 'a', 'b' and 'c'.

2. Perform a function on the measured signal consisting of A (the inverse model of the sensor output)=(s+a)/a further operated on by B (desired behavior of the sensor output)=$G_n(s)$=b/(s+b) yielding the accelerated output.

3. Optionally operate on the accelerated output with:
C (noise filter)=$G_p(s)$=−c/(s+c) yielding the filtered output that is accelerated and representative of the environmental attribute being detected by sensor 24.

The method of the present invention estimates the actual temperature based upon a rate of sensor value change and knowledge about how the senor behaves for a given change in the sensor value.

The present invention is a signal processing method that takes the derivative of the change in measured temperature and is filtered to thereby get a faster sensor reading that is physically possible with sensor 24.

From a calibration perspective the time domain of the sensor is needed and may be provided by the sensor supplier. For example, if the time constant is 10 seconds (variable A), and if we want a 2 second desired time constant (variable B), and a significantly faster noise filter such as 0.2 second time constant (variable C). Also it is noted that the time constant can vary by the velocity of mass flow 20 since the heat transfer varies by the flow of the mass passing the sensor, which can be data provided by a sensor manufacturer or determined in the application. Tables or equations can be utilized for the A values as a function of gas velocities and that B and C can also be a function of the gas velocity. As a result controller 14 will receive input from flow sensor 22 so that the variables A, B and C can be dynamically selected for the processing of the signal from sensor 24.

The present invention advantageously receives the sensor output, which may be sampled in a time domain basis. The signal is processed by a function of an inverse model representation of the actual responsiveness of the sensor and by the desired responsiveness of the sensor with that accelerated output then being filtered to reduce any noise that may be generated by the real time system to provide an accelerated sensor output that controller 14 can then utilize for controlling engine 12. Another advantage of the present invention is that the elements may be carried out by software embedded into controller 14 with no additional hardware being needed. Alternatively, another advantage of the present invention is that the elements may be carried out in a separate apparatus so that a legacy controller can be used allowing a faster response of information thereto to improve the performance of a legacy work machine 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A sensor response time acceleration method, comprising the steps of:
   reading a signal from a sensor, said signal representative of an environmental attribute as detected by said sensor, said signal being received by a controller; and
   operating on said signal with a function of an inverse model of said sensor and a function representative of a desired sensor model to yield an accelerated output representative of said environmental attribute.

2. The method of claim 1, further comprising the step of processing said accelerated output by operating on said accelerated output with a noise filter function to thereby yield a filtered accelerated output representative of said environmental attribute.

3. The method of claim 1, further comprising the steps of:
   determining an other environmental attribute proximate to said sensor; and
   adjusting said accelerated output dependent upon said other environmental attribute.

4. The method of claim 3, wherein the environmental attribute is one of a temperature and a gas concentration and said sensor is respectively one of a temperature sensor and a gas concentration sensor.

5. The method of claim 4, wherein said other environmental attribute is a mass velocity.

6. The method of claim 5, further comprising the step of processing said accelerated output by operating on said accelerated output with a noise filter function to thereby yield a filtered accelerated output representative of said environmental attribute.

7. The method of claim 1, wherein said sensor is coupled to an internal combustion engine.

8. A sensor response time acceleration method for use with a sensor coupled to an element of an internal combustion engine, the method comprising the steps of:
   reading a signal from the sensor, said signal representative of an environmental attribute as detected by the sensor; and
   operating on said signal with a function of an inverse model of said sensor and a function representative of a desired sensor model to yield an accelerated output representative of said environmental attribute, said reading step and said operating step being accomplished by a controller.

9. The method of claim 8, further comprising the step of processing said accelerated output by operating on said accelerated output with a noise filter function to thereby yield a filtered accelerated output representative of said environmental attribute.

10. The method of claim 8, further comprising the steps of:
    determining an other environmental attribute proximate to said sensor; and
    adjusting said accelerated output dependent upon said other environmental attribute.

11. The method of claim 10, wherein the environmental attribute is one of a temperature and a gas concentration and the sensor is respectively one of a temperature sensor and a gas concentration sensor.

12. The method of claim 11, wherein said other environmental attribute is a mass velocity.

13. The method of claim 12, further comprising the step of processing said accelerated output by operating on said accelerated output with a noise filter function to thereby yield a filtered accelerated output representative of said environmental attribute.

14. A work machine comprising:
a structural component;
at least one sensor outputting a signal representative of an environmental attribute sensed by said at least one sensor, said at least one sensor being coupled to said structural component; and
a controller configured to receive said signal and to arrive at a value for said environmental attribute by executing the step of:
operating on said signal with a function of an inverse model of said sensor and a function representative of a desired sensor model to yield an accelerated output representative of said environmental attribute.

15. The work machine of claim 14, wherein said controller is further configured to process said accelerated output by operating on said accelerated output with a noise filter function to thereby yield a filtered accelerated output representative of said environmental attribute.

16. The work machine of claim 14, wherein said controller is further configured to execute the steps of:
determining an other environmental attribute proximate to said at least one sensor; and
adjusting said value dependent upon said other environmental attribute.

17. The work machine of claim 16, wherein the environmental attribute is one of a temperature and a gas concentration and said sensor is respectively one of a temperature sensor and a gas concentration sensor.

18. The work machine of claim 17, wherein said other environmental attribute is a mass velocity.

19. The work machine of claim 18, wherein said controller is further configured to process said accelerated output by operating on said accelerated output with a noise filter function to thereby yield a filtered accelerated output representative of said environmental attribute.

20. The work machine of claim 14, further comprising an internal combustion engine, said structural component being associated with said internal combustion engine.

* * * * *